(12) United States Patent
Mikado

(10) Patent No.: US 11,112,767 B2
(45) Date of Patent: Sep. 7, 2021

(54) FEED SHAFT AND WORM GEAR ABNORMALITY DETERMINATION SYSTEM

(71) Applicant: NIKKEN KOSAKUSHO WORKS, LTD., Daito (JP)

(72) Inventor: Susumu Mikado, Nara (JP)

(73) Assignee: NIKKEN KOSAKUSHO WORKS, LTD., Daito (JP)

(*) Notice: Subject to any disclaimer, the term of this patent is extended or adjusted under 35 U.S.C. 154(b) by 224 days.

(21) Appl. No.: 16/594,446

(22) Filed: Oct. 7, 2019

(65) Prior Publication Data
US 2020/0133227 A1 Apr. 30, 2020

(30) Foreign Application Priority Data
Oct. 31, 2018 (JP) .............................. JP2018-204791

(51) Int. Cl.
*G05B 19/4062* (2006.01)
*G01M 13/021* (2019.01)

(52) U.S. Cl.
CPC ....... *G05B 19/4062* (2013.01); *G01M 13/021* (2013.01); *G05B 2219/34013* (2013.01); *G05B 2219/34465* (2013.01); *G05B 2219/49197* (2013.01)

(58) Field of Classification Search
CPC .......................... G05B 19/4062; G01M 13/021
USPC ................................................ 318/3; 73/162
See application file for complete search history.

(56) References Cited

U.S. PATENT DOCUMENTS

| | | | | |
|---|---|---|---|---|
| 9,488,687 | B2* | 11/2016 | Matsumura | ............ G01R 31/67 |
| 9,993,904 | B2 | 6/2018 | Miyaji | |
| 10,025,296 | B2 | 7/2018 | Iijima | |
| 10,328,970 | B2 | 6/2019 | Keum et al. | |
| 2008/0091383 | A1 | 4/2008 | Ueno | |
| 2008/0215292 | A1 | 9/2008 | Kato et al. | |

FOREIGN PATENT DOCUMENTS

| | | |
|---|---|---|
| CN | 105710711 A | 6/2016 |
| CN | 106066636 A | 11/2016 |
| CN | 205911736 U | 1/2017 |
| CN | 108388201 A | 8/2018 |

(Continued)

OTHER PUBLICATIONS

English translation of Japanese Office Action dated Nov. 24, 2020 in Japanese Patent Application 2018-204791, 4 pages.

(Continued)

*Primary Examiner* — David Luo
(74) *Attorney, Agent, or Firm* — W. F. Fasse

(57) ABSTRACT

A system determining whether the feed shafts are normal or abnormal, the system including: a command generation unit that moves the feed shafts in a forward direction at a predetermined speed from a lower limit value to an upper limit value of a range of feeding movement by the numerical controller; and a feed shaft abnormality determination unit that monitors a drive torque command during the movement of the feed shafts in the forward direction by the command generation unit, compares a monitoring result during the movement in the forward direction with a normal value of the drive torque command, determines that abnormality occurs when the drive torque command deviates from the normal value, and outputs the determination result.

12 Claims, 8 Drawing Sheets

(56) References Cited

FOREIGN PATENT DOCUMENTS

| | | |
|---|---|---|
| CN | 108454697 A | 8/2018 |
| JP | 05-285788 A | 11/1993 |
| JP | 10-286743 A | 10/1998 |
| JP | 2003-224994 A | 8/2003 |
| JP | 2008-097363 A | 4/2008 |
| JP | 2009-020090 A | 1/2009 |
| JP | 2012-035367 A | 2/2012 |
| JP | 2017-021472 A | 1/2017 |
| JP | 2018-017689 A | 2/2018 |
| JP | 2018-025295 A | 2/2018 |
| JP | 2018-026118 A | 2/2018 |
| KR | 10-1892174 B1 | 8/2018 |
| WO | WO 96/40558 | 12/1996 |

OTHER PUBLICATIONS

English translation (computer-generated) of Japanese Office Action dated Jun. 2, 2020 in Japanese Patent Application 2018-204791, 5 pages.

European Examiner Dimitrios Tsirigkas, Extended European Search Report and Examination Report for European Patent Application No. 19204327.1, dated Apr. 6, 2020, 9 pages, European Patent Office, Munich, Germany.

English translation of Chinese Office Action and Search Report dated Apr. 2, 2021 in Chinese Patent Application 201910979239.0, 15 pages.

\* cited by examiner

FEED SHAFT AND WORM GEAR ABNORMALITY DETERMINATION SYSTEM

BACKGROUND OF THE INVENTION

(1) Field of the Invention

The present invention relates to an abnormality determination system used for numerical control (NC) machine tools.

(2) Description of Related Art

Machining centers classified as machine tools have multiple feed shafts for movement in a linear direction such as an X axis, a Y axis, and a Z axis, and for movement in a rotation direction such as an A axis, a B axis, and a C axis, and machine a workpiece by moving a spindle to positions on the X axis, Y axis, Z axis, A axis, B axis, and C axis at a predetermined speed by numerical control (NC). The feeding operation described above is achieved by controlling servo motors that drive feed shafts corresponding to the respective axes in a feedback manner.

A numerically controlled rotary table device which is a representative example includes a circular table, a spindle connected to the bottom part of the circular table, a worm gear provided on the spindle, a worm screw that engages with the worm gear, a main gear provided to a shaft of the worm screw, a motor gear that engages with the main gear, a servo motor connected to the motor gear, and a controller for controlling the drive torque of the servo motor. The spindle is, for example, a feed shaft for the A axis, and performs a feeding operation in the rotation direction.

Specifically, the worm gear and the worm screw are engaged with each other, and the drive torque of the servo motor is transmitted to the worm screw via the motor gear and the main gear to rotate the worm gear. The worm gear is attached to the outer periphery of the spindle of the rotary table, so that the circular table rotates with the rotation of the worm gear and is indexed at a desired angle.

A method for correcting an indexing error in a representative example (NC indexing unit) such as a rotary table device is disclosed in Patent Literature 1 below, for example. The principle of correcting the indexing error in Patent Literature 1 is to quickly complete the correction of the indexing error on the basis of the knowledge that the distribution of the indexing error of the rotary table for 360° is represented by a trigonometric function in which the indexing error is zero at rotation angles of 0°, 180°, and 360° and is the maximum at rotation angles of 90° and 270°.

CITATION LIST

Patent Literature

Patent Literature 1: Japanese Unexamined Patent Publication No. 2012-035367

In Patent Literature 1, it is first necessary to measure an error every 1° when the rotary table is rotated 360°. The error is measured by a measuring device such as a rotary encoder attached to the rear end of the spindle. Such measurement requires setting of the rotary encoder and collection of data, for example, and thus requires manpower and time.

Nowadays, there is increasing demand for labor-saving and efficient machine tools. In view of this, for example, it is advantageous in production control to enable easy and quick diagnosis of poor accuracy in measuring an index angle during idle time such as when a machine tool is started or when a workpiece is not chucked to the machine tool.

An object of the present invention is to provide a technique for diagnosing and determining whether or not a feed shaft of an NC machine tool is accurately indexed more easily and quickly than ever before.

SUMMARY OF THE INVENTION

A worm gear abnormality determination system according to the present invention is mounted on an indexing unit including a spindle which performs indexing, a worm gear provided on the spindle, a worm screw that engages with the worm gear, a servo motor that drives the worm screw, a numerical controller that controls a drive torque of the servo motor, and an encoder that detects a speed or a position of the spindle, the system determining whether the spindle is normal or abnormal, the system comprising: a command generation unit that rotates the spindle in a forward direction at a predetermined speed from an index angle of 0° to 360° by the numerical controller; and a worm gear abnormality determination unit that monitors a drive torque command and/or a position feedback output to the servo motor from the numerical controller during the forward rotation of the spindle by the command generation unit, compares the monitoring result during the forward rotation and a normal value of the drive torque command, determines that the spindle is normal when the drive torque command does not deviate from the normal value, determines that the spindle is abnormal when the drive torque command deviates from the normal value, and outputs the determination result. The worm gear abnormality determination unit calculates an index angle of the spindle on the basis of the predetermined speed of the servo motor and a time from when the forward rotation of the spindle is started until the drive torque command deviates from the normal value or on the basis of the position feedback, and outputs the index angle associated with the drive torque command deviating from the normal value as an abnormal index angle.

According to the worm gear abnormality determination system of the present invention, abnormality of the worm gear of the spindle can be found from the data relating to the numerical control of the servo motor without attaching a measuring device to the spindle. For example, the numerical controller performs feedback control of the servo motor on the basis of the rotation angle of the rotary shaft of the servo motor detected by the encoder provided to the servo motor, and further calculates the angle and position of the spindle. The spindle is, for example, a rotary shaft of a rotary table device or a tilt shaft. The worm gear abnormality determination system according to the present invention may be, for example, a single NC machine tool, may be, for example, a combination of a computer and an NC machine tool separated from each other, or may be, for example, a network including a single computer and a plurality of NC machine tools which are separated from each other. According to the present invention, it is possible to distinguish between an abnormal index angle and an index angle that is normally indexed, and this facilitates the maintenance and inspection of the indexing unit.

Although not particularly limited, the predetermined speed of the servo motor described above is, for example, a constant speed. The normal value of the drive torque command is stored in advance in the worm gear abnormality detection unit, or is input to the worm gear abnormality detection unit from the outside. The forward rotation may be clockwise or counterclockwise when viewed from the front of the spindle. As one aspect of the present invention, the normal value is a drive torque command after an indexing unit to which rotating members such as a spindle and a table are newly attached is subjected to a break-in operation, jigs required for machining a workpiece are mounted to the machine tool, and the machine tool is operated. Here, the normal value is preferably the drive torque command immediately after the first trial operation.

The normal value of the drive torque command has a fluctuation range between an upper limit value and a lower limit value. The upper limit value and the lower limit value of the normal value are constant throughout the range of 0° to 360°, for example. Alternatively, they are represented by a sine curve within the range of 0° to 360°, for example. In the present invention, the state in which the monitoring result of the drive torque command deviates from the normal value indicates, for example, a state in which the monitoring result deviates and increases from the fluctuation range of the normal value, or the monitoring result deviates and decreases from the fluctuation range of the normal value.

As one aspect of the present invention, the deviation of the monitoring result indicates a state in which the monitoring result of the drive torque command is greater than a value obtained by multiplying the normal value by a predetermined factor greater than 1. For example, if the fluctuation range of the drive torque command, which is defined as a normal value, is multiplied by a factor of 1.3, and the monitoring result of the drive torque command is 30% or more larger than the upper limit value of the normal value, it is determined that the drive torque command has deviated from the normal value and that abnormality has occurred.

The determination of whether the worm gear is normal or abnormal may be performed by rotating the spindle forward only once. However, as a preferable aspect, the spindle may further be reversely rotated. Alternatively, the determination may be performed by rotating the spindle two or more times. For example, the command generation unit reversely rotates the spindle by the numerical controller at a predetermined speed from an index angle of 360° to 0°, and the worm gear abnormality determination unit calculates an index angle of the spindle on the basis of a predetermined speed of the servo motor during the reverse rotation and a time from when the reverse rotation of the spindle is started until the deviation during the reverse rotation or on the basis of a position feedback output to the servo motor, and outputs the index angle as an abnormal index angle. According to this aspect, the abnormality determination is performed during both rotations, so that the performance for determining abnormality in the worm gear is improved.

As a preferable aspect, the present invention further includes a backlash amount calculation unit that calculates a backlash amount at a position where the worm gear and the worm screw are engaged with each other at the abnormal index angle. According to this aspect, if the backlash amount is small, a parameter of the numerical control is corrected, by which the indexing unit can be used continuously.

As one aspect, a rotary table is fixed to the spindle. Further, the backlash amount calculation unit executes a backlash calculation program for firstly rotating the spindle in a forward direction up to the abnormal index angle by the numerical controller, and secondly rotating the spindle in a reverse direction by the numerical controller, and calculates a backlash amount during the reverse rotation on the basis of a change over time of the drive torque command during the reverse rotation or on the basis of a change in the drive torque command with respect to position during the reverse rotation.

As a preferable aspect, when it is determined that there is abnormality at a plurality of index angles within a range of 0° to 360°, the backlash amount calculation unit calculates the backlash amount at all the abnormal index angles. As a more preferable aspect, the system further includes an index angle abnormality determination display unit that displays information, such as an abnormal index angle, output from the worm gear abnormality determination unit.

The abnormality determination system according to the present invention can be applied to a feed shaft that indexes a feeding position by a rotational operation, such as the spindle and the worm gear described above, and also applied to various kinds of feed shafts for an X axis, Y axis, Z axis, A axis, B axis, and C axis in NC machine tools.

That is, a feed shaft abnormality determination system according to the present invention in which the spindle is replaced by a feed shaft and the index angle is replaced by a feeding position is a system mounted on a machine tool that includes a feed shaft, a servo motor that drives the feed shaft, a numerical controller that controls a drive torque of the servo motor, and an encoder that detects a speed and a position of the feed shaft, the system determining whether the feed shaft is normal or abnormal, the system comprising: a command generation unit that moves the feed shaft in a forward direction at a predetermined speed from a lower limit value to an upper limit value of a range of feeding movement by the numerical controller; and a feed shaft abnormality determination unit that monitors a drive torque command and/or a position feedback output to the servo motor from the numerical controller during the movement of the feed shaft in the forward direction by the command generation unit, compares a monitoring result during the movement in the forward direction with a normal value of the drive torque command, determines that an abnormality occurs when the drive torque command deviates from the normal value or on the basis of the position feedback, and outputs the determination result. The feed shaft abnormality determination unit calculates a feeding position of the feed shaft on the basis of the predetermined speed of the servo motor and a time from when the movement of the feed shaft in the forward direction is started until the deviation during the movement in the forward direction, and outputs the calculated feeding position as an abnormal feeding position.

The feed shaft may be, for example, the spindle by a rotational motion. In this case, the spindle may be driven through a gear mechanism using the worm gear described above, or the spindle may be driven by a direct-acting motor (direct drive electric motor). Alternatively, the feed shaft performs a feeding operation by a linear motion such as a straight line motion. For example, the output rotation of the servo motor is converted into a linear motion via a ball screw mechanism. The encoder is provided, for example, in a servo motor, detects the speed or position of the rotary shaft of the servo motor, and can detect the speed or position of the feed shaft on the basis of the detection result.

As one aspect of the feed shaft abnormality determination system according to the present invention, the normal value is a drive torque command after a machine tool is newly assembled and subjected to a break-in operation, jigs required for machining a workpiece are mounted to the machine tool, and the machine tool is operated. In this way, whether the drive torque command of a machine tool which has degraded with age deviates from the normal value is determined using the drive torque command of a nearly completely new machine tool as the normal value.

As one aspect of the feed shaft abnormality determination system according to the present invention, the deviation indicates a state in which the monitoring result of the drive torque command is greater than a value obtained by multiplying the normal value by a predetermined factor greater than 1, for example, 1.3 which is 30% greater than 1.

As one aspect of the feed shaft abnormality determination system according to the present invention, the command generation unit moves the feed shaft in a reverse direction by the numerical controller at a predetermined speed from the upper limit value to the lower limit value within the range of feeding movement, and the feed shaft abnormality determination unit calculates a feeding position of the feed shaft on the basis of the predetermined speed and a time from when the feed shaft starts the movement in the reverse direction until the deviation during the movement in the reverse direction or on the basis of the position feedback, and outputs the calculated feeding position as an abnormal feeding position. According to this aspect, the determination accuracy is improved.

As described above, according to the present invention, it is possible to diagnose/determine whether the index angle is normal or abnormal for determining whether the spindle is accurately indexed more easily and quickly than ever before. Further, according to the present invention, the machine tool can self-diagnose whether the index angle is normal or abnormal, whereby laborsaving and efficient inspection of the indexing unit is enabled.

DETAILED DESCRIPTION OF PREFERRED EMBODIMENT

An embodiment of the present invention will now be described in detail with reference to the drawings. First, an A-axis rotary table device will be described as a typical example of a feed shaft.

Figure 1:
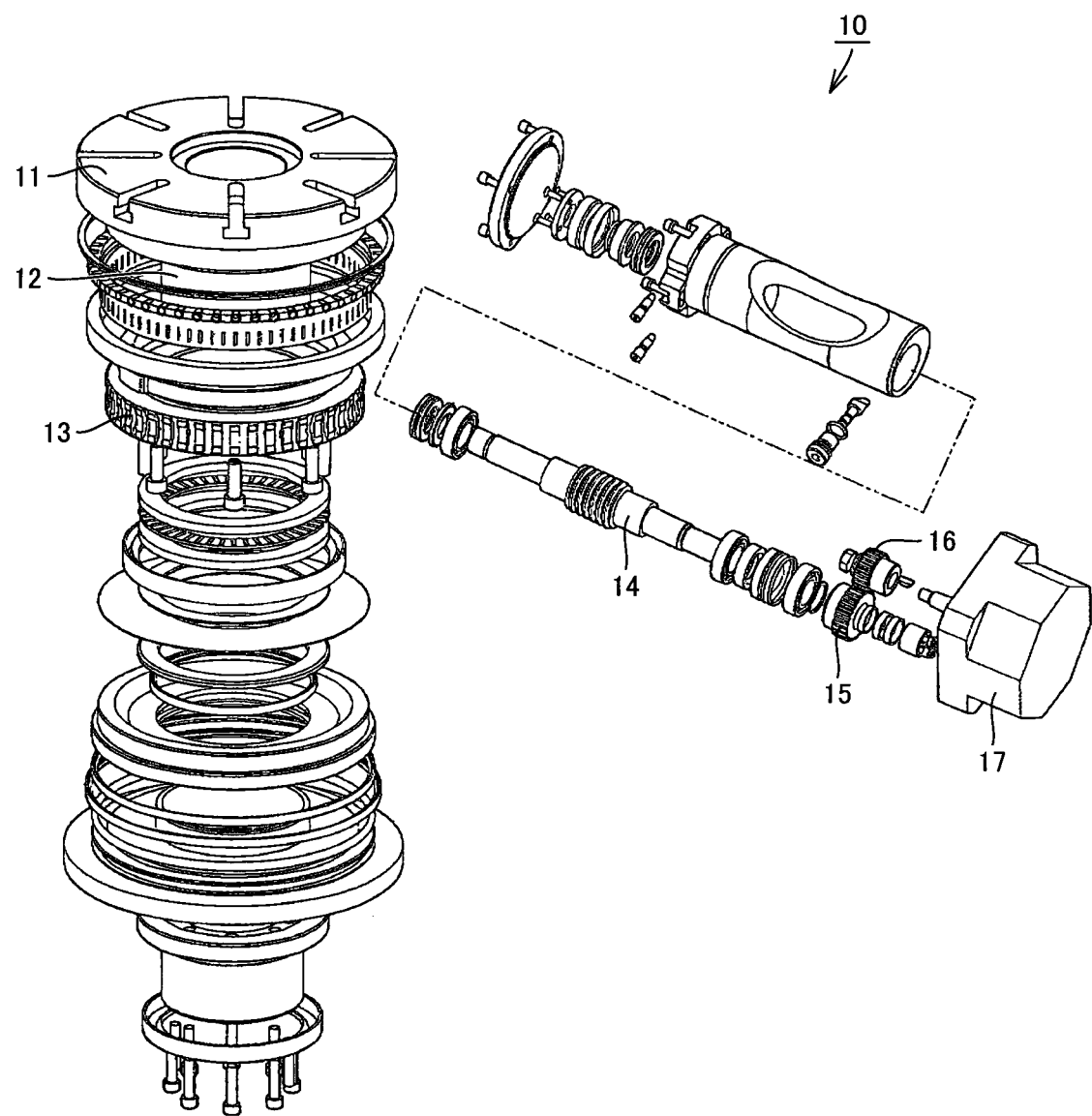
FIG. 1 is an exploded perspective view of an indexing unit that performs indexing of a spindle.
Figure 2:
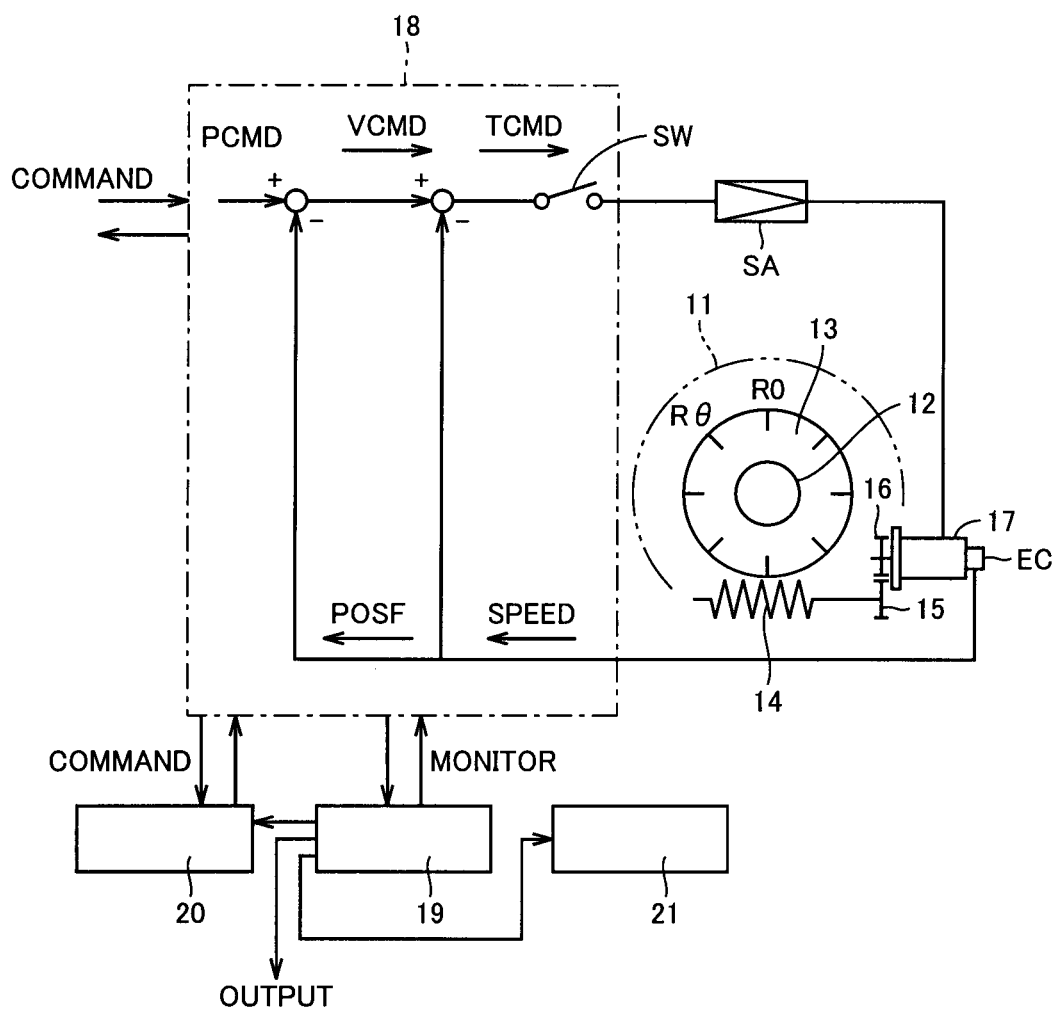
FIG. 2 is a schematic diagram illustrating servo control executed in a rotary table device.
Figure 3:
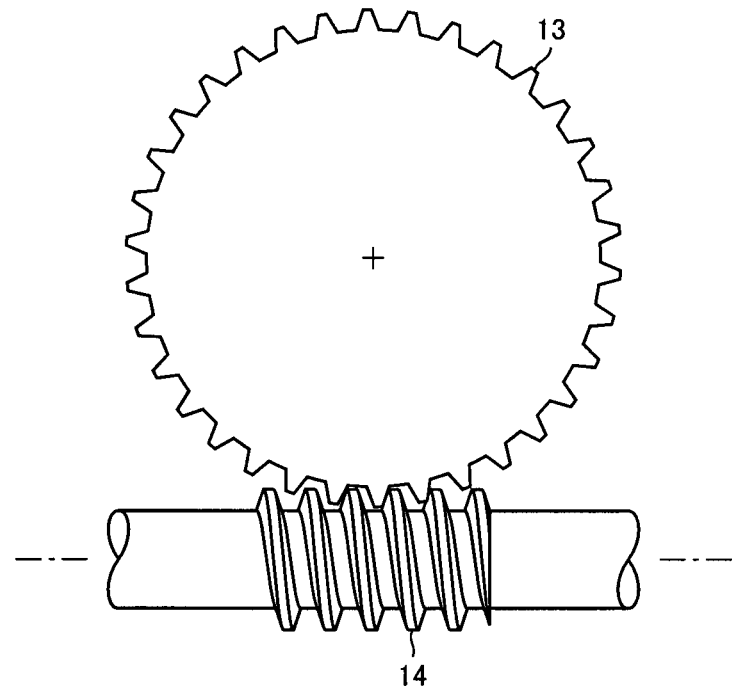
FIG. 3 is a front view of a worm gear and a worm screw.

FIG. 1 is an exploded perspective view illustrating a rotary table device as an example of an indexing unit. FIG. 2 is a schematic diagram illustrating servo control executed in the rotary table device. The indexing unit 10 includes a table 11, a spindle 12, a worm gear 13, a worm screw 14, a main gear 15, a motor gear 16, a servo motor 17, a numerical controller 18, a worm gear abnormality determination unit 19, a backlash amount calculation unit 20, and a worm gear abnormality display unit 21, and constitutes a main part of the rotary table device.

The table 11 is circular, for example, and is rotatably supported by a housing (not shown). A workpiece (not shown) is chucked on the surface of the table 11. The spindle 12 is erected on the back surface of the table. The spindle 12 is a rotary shaft for rotating the workpiece. As a modification (not shown), the spindle 12 may be a tilt shaft for tilting the workpiece. The worm gear 13 is attached to the spindle 12 so as to be coaxial with the spindle 12 and engages with the worm screw 14. The worm screw 14 is rotatably supported by shafts on both sides. The main gear 15 is provided at an end of one of the shafts of the worm screw 14. The motor gear 16 is provided on a rotary shaft of the servo motor 17 and engages with the main gear 15.

The servo motor 17 is provided with an encoder EC. The encoder EC detects the rotation angle (that is, speed or position) of the rotary shaft of the servo motor 17 and outputs the detected rotation angle to the numerical controller 18. The numerical controller 18 that receives the speed feedback of the servo motor 17 from the encoder EC controls the servo motor 17 in a feedback manner. The numerical controller 18 is connected to an external command generation unit (not shown). The command generation unit outputs a position command PCMD to the numerical controller 18 on the basis of a numerical control program. Note that the command generation unit may be provided in the rotary table device, or may be provided outside the rotary table device, for example, in a host computer that comprehensively controls a plurality of rotary table devices.

The encoder EC outputs a speed feedback SPEED of the servo motor 17 or a position feedback POSF to the numerical controller 18. The numerical controller 18 obtains a speed command VCMD on the basis of the difference between the position command PCMD of the table 11 and the position feedback POSF. The numerical controller 18 also obtains a drive torque command TCMD on the basis of the difference between the speed command VCMD and the speed feedback SPEED, and outputs the drive torque command TCMD to a servo amplifier SA via a switch SW. The servo amplifier SA amplifies the input drive torque command TCMD and outputs the amplified drive torque command TCMD to the servo motor 17. The drive torque command TCMD is output at a predetermined interval which is within 1 [msec].

When the numerical controller 18 outputs the drive torque command TCMD to the servo motor 17 via the servo amplifier SA in response to the position command PCMD, the servo motor 17 drives and rotates the motor gear 16 according to the input drive torque command TCMD. The rotation is transmitted from the motor gear 16 to the worm gear 13 via the main gear 15 and the worm screw 14, and the spindle 12 and the table 11 are indexed according to the numerical control program.

In the present embodiment, a worm gear abnormality determination mode by the worm gear abnormality determination unit 19 is executed in addition to the indexing of the table 11 by the external command generation unit.

At least one kind of the servo data including the position command PCMD, the speed command VCMD, the drive torque command TCMD, the speed feedback SPEED, and the position feedback POSF shown in FIG. 2 is monitored by a monitor unit of the worm gear abnormality determination unit 19. Being monitored means being continuously monitored.

The worm gear abnormality determination unit 19 determines whether or not the spindle 12 has been indexed with accuracy that satisfies a predetermined accuracy on the basis of the monitoring result of the servo data. The worm gear abnormality determination unit 19 may be built in the rotary table device, or provided outside the rotary table device and connected to the numerical controller 18 through a data communication unit such as a network unit.

In the worm gear abnormality determination mode, the numerical controller 18 receives the position command PCMD to rotate the spindle 12 once. The spindle 12 is rotated once at a predetermined speed from an index angle R0° to R360° (=0°). In the worm gear abnormality determination mode, the worm gear abnormality determination unit 19 monitors the drive torque command TCMD and stores a change over time of the drive torque command TCMD. The worm gear abnormality determination unit 19 also calculates and stores an index angle Rθ of the spindle 12 corresponding to the drive torque command TCMD. The index angle Rθ can be calculated on the basis of the speed feedback SPEED or the position feedback POSF from the encoder EC.

The predetermined speed or the predetermined speed command VCMD is, for example, a constant speed. It is to be noted that, in order to improve the determination accuracy, the speed command VCMD to the servo motor 17 that accompanies the index angle abnormality determination is in a low speed region, and the workpiece is not chucked on the table 11 in the worm gear abnormality determination mode. On the other hand, in order to improve work efficiency, the speed command VCMD to the servo motor 17 when the table 11 chucks the workpiece ranges from a low speed region to a high speed region.

Figure 4:
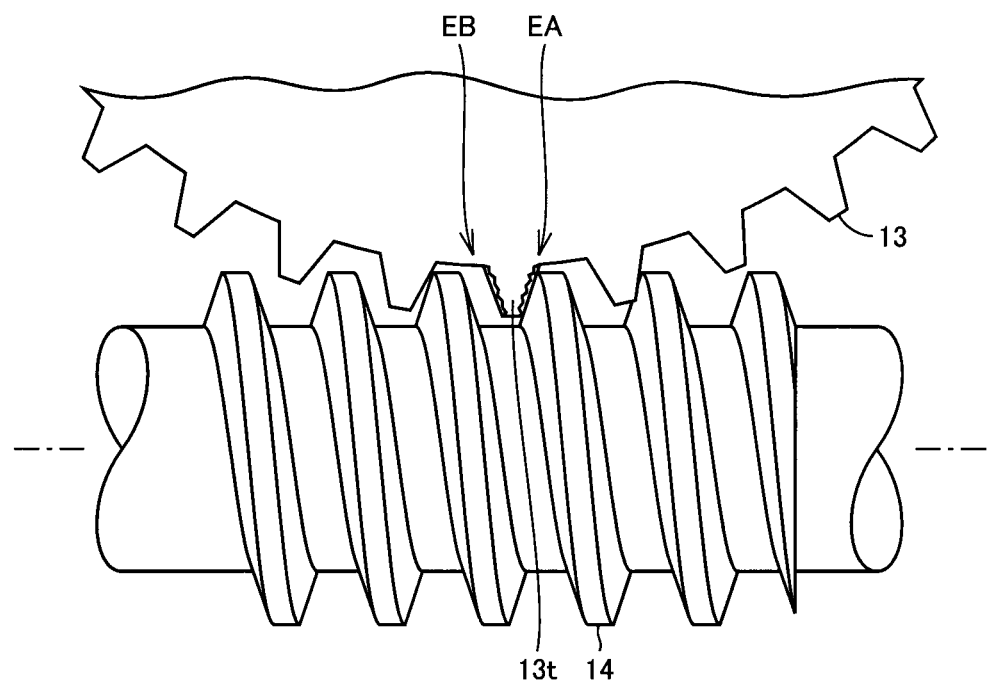
FIG. 4 is an enlarged view showing a contact surface of the worm gear engaging with the worm screw in FIG. 3.

For example, in an indexing unit 10 that has been used for several years, the tooth surface of the worm gear 13 may be partially worn in the circumferential direction as shown in FIG. 4. Comparing the tooth surface of the worm gear 13 that has been partially worn and the tooth surface of a normal worm gear 13, the contact with the worm screw 14 is different, and therefore, the drive torque command TCMD is also different.

Figure 5:
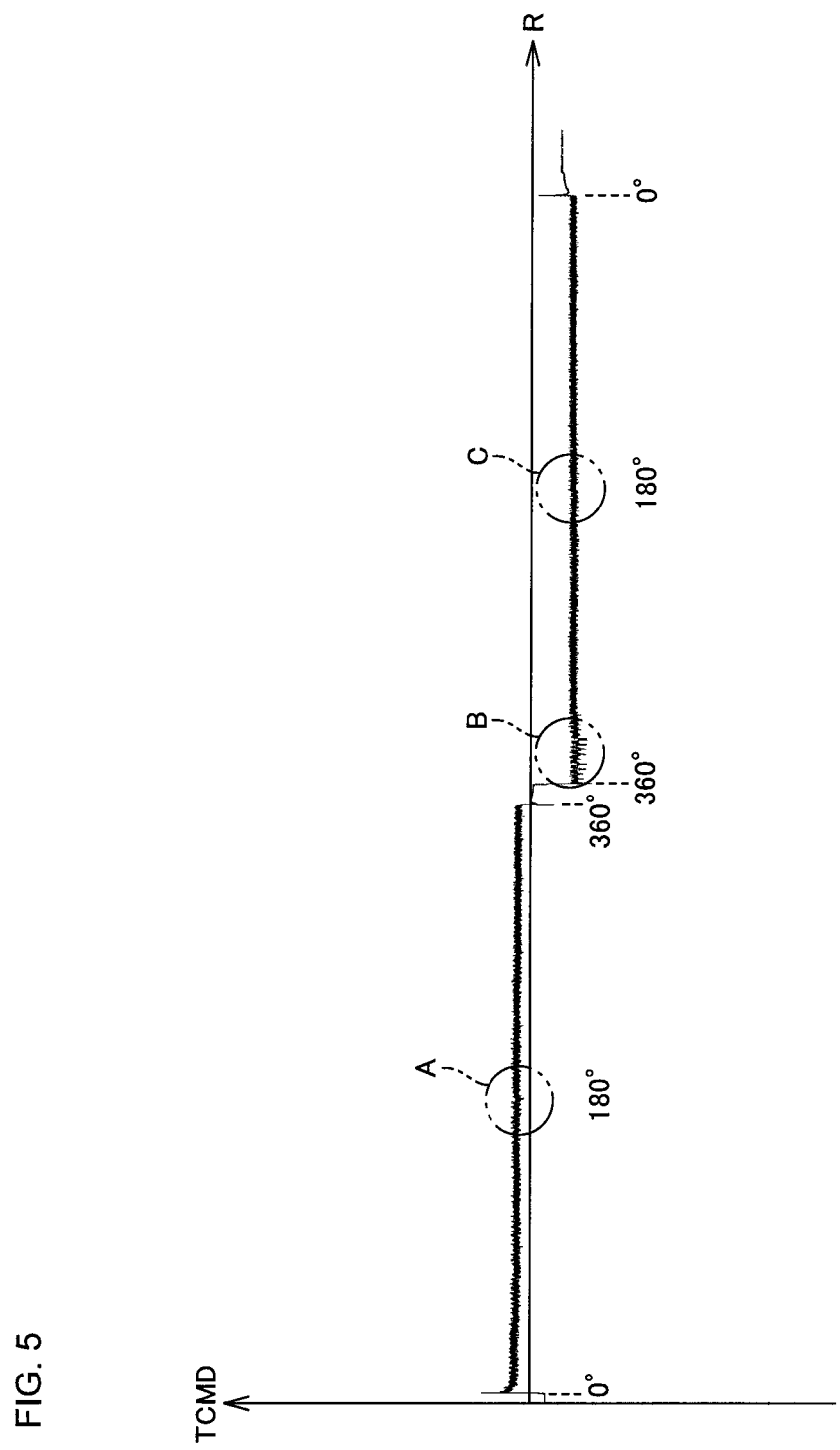
FIG. 5 is a graph illustrating a monitoring result of a drive torque command output from a numerical controller of the rotary table device to the servo motor of the spindle (abnormal value)

FIG. 5 is a graph showing the monitoring result of the drive torque command TCMD. This graph shows the case where the worm gear is determined to be abnormal. When the spindle 12 is rotated in the forward direction from the index angle 360° to 0° with a predetermined speed command VCMD and then rotated in a reverse direction from the index angle 360° to 0°, the drive torque command TCMD distorts around an angle of 180° (circle A) during the forward rotation, and deviates from the normal value. Also, during the reverse rotation, the drive torque command TCMD distorts around the index angles of 350° (circle B) and 90° (circle C), and deviates from the normal value. In FIG. 5, the vertical axis represents the drive torque command TCMD, and in FIG. 5, the horizontal axis represents time. Since the servo motor 17 rotates at a constant speed, it can be said that the horizontal axis represents the index angle R.

The normal value data of the drive torque command TCMD is stored in advance for forward rotation and reverse rotation. The worm gear abnormality determination unit 19 compares the monitoring result with the normal value and finds the distortion in the monitoring result.

The reason why the drive torque command TCMD distorts is that contacts EA and EB between the tooth surfaces of one abnormal tooth 13t of the worm gear 13 and the worm screw 14 are different from the contacts between the remaining normal teeth of the worm gear 13 and the worm screw 14, as shown in FIG. 4. The contact EA indicates a contact when the spindle 12 and the worm gear 13 rotate forward in the clockwise direction when viewed from the surface of the table 11. The contact EB indicates a contact when the spindle 12 and the worm gear 13 reversely rotate in the counterclockwise direction when viewed from the surface of the table 11. By monitoring the forward rotation and the reverse rotation, the performance of detecting abnormality of the worm gear is improved.

The worm gear abnormality determination unit 19 determines that there is an abnormality in the index angle around the index angle R180° on the basis of the monitoring result shown in FIG. 5, and outputs the determination result to the outside. The worm gear abnormality determination unit 19 also determines that there is a possibility of abnormality in the index angle around the index angle R350°, and outputs the determination result to the outside and/or to the worm gear abnormality display unit 21. In the example in FIG. 5, the determined index angles R180° and R350° are abnormal index angles.

The worm gear abnormality display unit 21 displays an occurrence of abnormality in the worm gear 13 and the abnormal index angle by sound or image.

Figure 6:
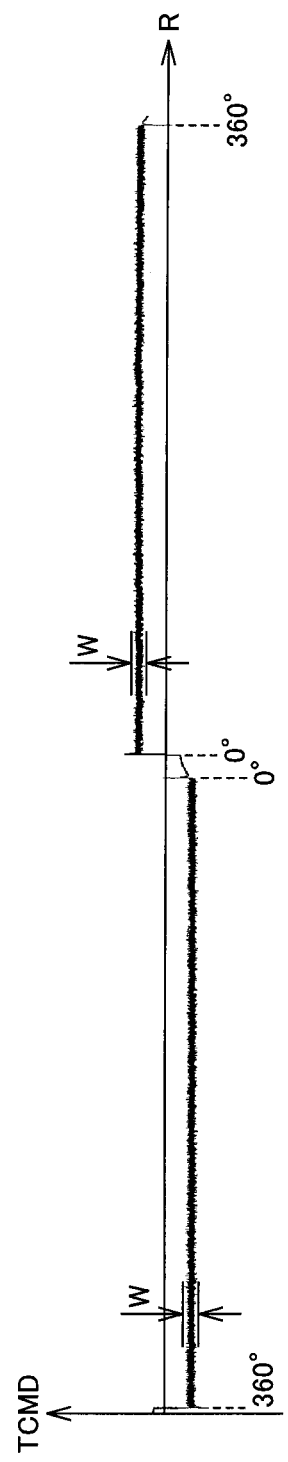
FIG. 6 is a graph illustrating a monitoring result of a drive torque command output from the numerical controller of the rotary table device to the servo motor of the spindle (normal value)

For comparison, FIG. 6 shows a monitoring result (graph) of the drive torque command TCMD when the worm gear is determined to be normal. When the spindle 12 is reversely rotated from the index angle 360° to 0° with the predetermined speed command VCMD and then rotated forward from the index angle 0° to 360°, the drive torque command TCMD does not distort and does not deviate from the normal value. The normal value indicates a smooth waveform in which the drive torque command TCMD fluctuates with a constant fluctuation range W per unit angle of the servo motor 17.

FIG. 6 shows a monitoring result of, for example, a brand-new state just after assembly. It is preferable that the worm gear abnormality determination unit 19 stores the monitoring result shown in FIG. 6 as a normal value.

Returning to FIG. 5, the worm gear abnormality determination unit 19 finds that the drive torque command TCMD in the monitoring result is smaller than the fluctuation range W at an index angle R180° (circles A and C) for a predetermined time, and the drive torque command TCMD greatly fluctuates beyond the fluctuation range W at the index angle R350° (circle B).

When the determination result shows that the worm gear is abnormal at the index angles R180° and R350° as described above, the backlash amount calculation unit 20 is activated. The backlash amount calculation unit 20 executes a backlash calculation program to calculate a backlash amount at the abnormal index angle.

The backlash amount in the reverse direction of a mechanical system is calculated as follows. First, the mechanical system is rotated forward and stopped, and then, the speed command VCMD and/or the chive torque command TCMD for reverse rotation is output from the numerical controller 18 to the servo motor 17. The backlash amount is calculated on the basis of the time required for the mechanical system to actually start the reverse rotation after the start of output of the drive torque command TCMD for reverse rotation and the monitoring result (change over time) of the drive torque command TCMD during the reverse rotation. Note that, in order to calculate the backlash amount with high accuracy, it is preferable that the speed command VCMD for the forward rotation and the speed command VCMD for the reverse rotation described above are in a lower speed region rather than in a high speed region used when the workpiece is machined. Moreover, it is preferable to reversely rotate the mechanical system on a constant side.

The present embodiment provides a device that is mounted to the indexing unit 10 including: the spindle 12 that performs indexing; the worm gear 13 provided on the spindle 12; the worm screw 14 that engages with the worm gear 13; the servo motor 17 that drives the worm screw 14; the numerical controller 18 that controls a drive torque of the servo motor 17; and the encoder EC that detects the rotation angle of the servo motor 17, the device determining whether the index angle R of the spindle 12 indexed by the indexing unit 10 is normal or abnormal, the device including an external command generation unit that rotates the spindle 12 forward at a predetermined speed from the index angle R0° to R360° by outputting the drive torque command TCMD to the servo motor 17 from the numerical controller 18, and a worm gear abnormality determination unit 19 that monitors the drive torque command TCMD during the forward rotation of the spindle 12 by the command generation unit, compares a monitoring result (FIG. 5) during the forward rotation with a normal value of the drive torque command TCMD (FIG. 6), determines that abnormality occurs when the drive torque command TCMD in FIG. 5 deviates from the normal value in FIG. 6, and outputs the determination result. According to the present embodiment, the accuracy of the index angle of the spindle 12 is determined using the servo motor of the numerical controller 18. Therefore, when the accuracy of the index angle is checked, an operation for attaching a rotary encoder at the rear end of the spindle 12 and measuring the index angle is unnecessary. Accordingly, it is possible to diagnose/determine whether indexing is accurately performed, that is, whether the index angle is normal or abnormal, more easily and quickly than ever before. Further, according to the present embodiment, the machine tool can self-diagnose whether the index angle is normal or abnormal, whereby labor-saving and efficient inspection of the indexing unit is enabled.

The normal value shown in FIG. 6 indicates, for example, a drive torque command immediately after a break-in of the indexing unit 10 to which the spindle 12 is newly attached. This is because, in the indexing unit 10 that is nearly completely new, there is no wear on the various rotating members, and the drive torque command indicates a normal value.

Further, the worm gear abnormality determination unit 19 according to the present embodiment calculates the index angle (R90° in FIG. 5) of the spindle 12 on the basis of a predetermined constant speed and the time from the start of rotation of the spindle 12 (R0°) until the drive torque command deviates (circle A in FIG. 5), and outputs the index angle Rθ as an abnormal index angle. The timing at which the drive torque command TCMD deviates is detected by comparing the drive torque command TCMD related to the monitoring result with the normal value data of the drive torque command in time series.

In addition, the command generation unit according to the present embodiment reversely rotates the spindle 12 at a predetermined speed from an index angle 360° to 0° by outputting the drive torque command TCMD to the servo motor 17 from the numerical controller 18, and the worm gear abnormality determination unit 19 monitors the drive torque command TCMD and the index angle Rθ detected by the encoder EC during the reverse rotation of the spindle 12, compares a monitoring result during the reverse rotation with the normal value of the drive torque command TCMD, and outputs the index angle Rθ associated with the drive torque command TCMD deviating from the normal value as an abnormal index angle. This makes it easier to find abnormality in the worm gear. In addition, the abnormal index angle can be found correctly.

In addition, the present embodiment further includes the backlash amount calculation unit 20 that calculates a backlash amount at the contacts EA and EB between the worm gear 13 and the worm screw 14 at the abnormal index angle.

Further, the backlash amount calculation unit 20 according to the present embodiment executes a backlash calculation program for firstly rotating the spindle 12 forward up to the abnormal index angle R180° by outputting the drive torque command TCMD to the servo motor 17 from the numerical controller 18, and secondly rotating the spindle 12 reversely by outputting the drive torque command to the servo motor 17 from the numerical controller 18, and calculates a backlash amount during the reverse rotation on the basis of a change over time of the drive torque command TCMD.

If it is determined that abnormality occurs at a plurality of index angles, the backlash amount calculation unit 20 calculates the backlash amount at all the abnormal index angles Rθ.

The present embodiment further includes the worm gear abnormality display unit 21 that displays information output from the worm gear abnormality determination unit 19.

Figure 7:
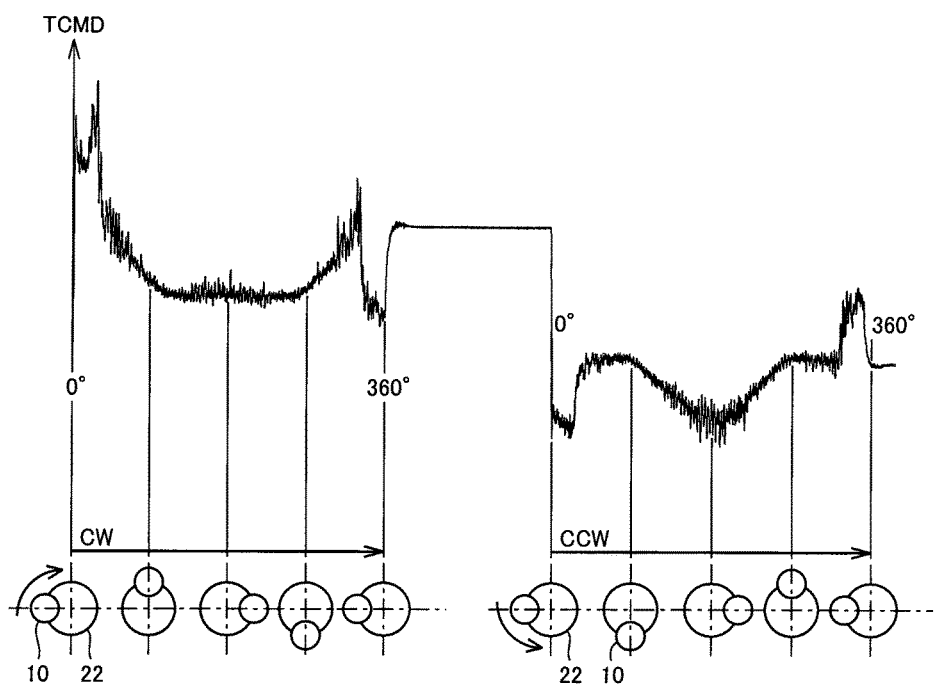
FIG. 7 shows a schematic diagram for describing, in time series, an unbalanced load acting on a tilt shaft, and a graph which corresponds to the schematic diagram and illustrates a drive torque command output from the numerical controller to a servo motor of the tilt shaft.

Next, the case where the present invention is applied to a tilt shaft will be described. The lower part of FIG. 7 shows a schematic diagram illustrating imbalance in rotation of the tilt shaft in time series. The upper part of FIG. 7 shows a graph illustrating a drive torque command output from the numerical controller of the rotary table device to a servo motor of the tilt shaft.

The rotary table device provided with the tilt shaft 22 has the spindle 12 shown in FIG. 1 as a rotary shaft, and further has the tilt shaft 22 (lower part in FIG. 7) for tilting the entirety of the indexing unit 10 shown in FIG. 1. The indexing unit for indexing the tilt shaft 22 has the same configuration as that shown in FIGS. 1 and 2, so that duplicate description is omitted here.

As shown in the lower part of FIG. 7, the center of gravity of the rotary shaft in the indexing unit 10 is offset from the center of the tilt shaft 22 and positioned in an unbalanced manner. In order to determine whether or not the index angle of the tilt shaft 22 is abnormal, the external command generation unit rotates the tilt shaft 22 forward in the clockwise direction by the numerical controller 18 as shown in the lower left part of FIG. 7. The external command generation unit also reversely rotates the tilt shaft 22 in the counterclockwise direction by the numerical controller 18 as shown in the lower right part of FIG. 7.

The drive torque command at that moment is as shown in the upper part of FIG. 7, for example, and does not have the constant fluctuation range W shown in FIG. 6. The worm gear abnormality determination unit 19 stores the normal value shown in the upper part of FIG. 7 in advance, compares the monitoring result of the drive torque command with the normal value to determine whether the index angle is normal or abnormal, calculates the abnormal index angle, and outputs the results to the worm gear abnormality display unit 21.

The normal value indicates a drive torque command immediately after a break-in of the indexing unit to which the tilt shaft 22 is newly attached.

According to the embodiment shown in FIG. 7, the worm gear abnormality determination unit 19 determines whether the index angle of the tilt shaft of the rotary table device is normal or abnormal, whereby labor-saving and efficient inspection is enabled for the tilt shaft as well as for the rotary shaft.

Figure 8:
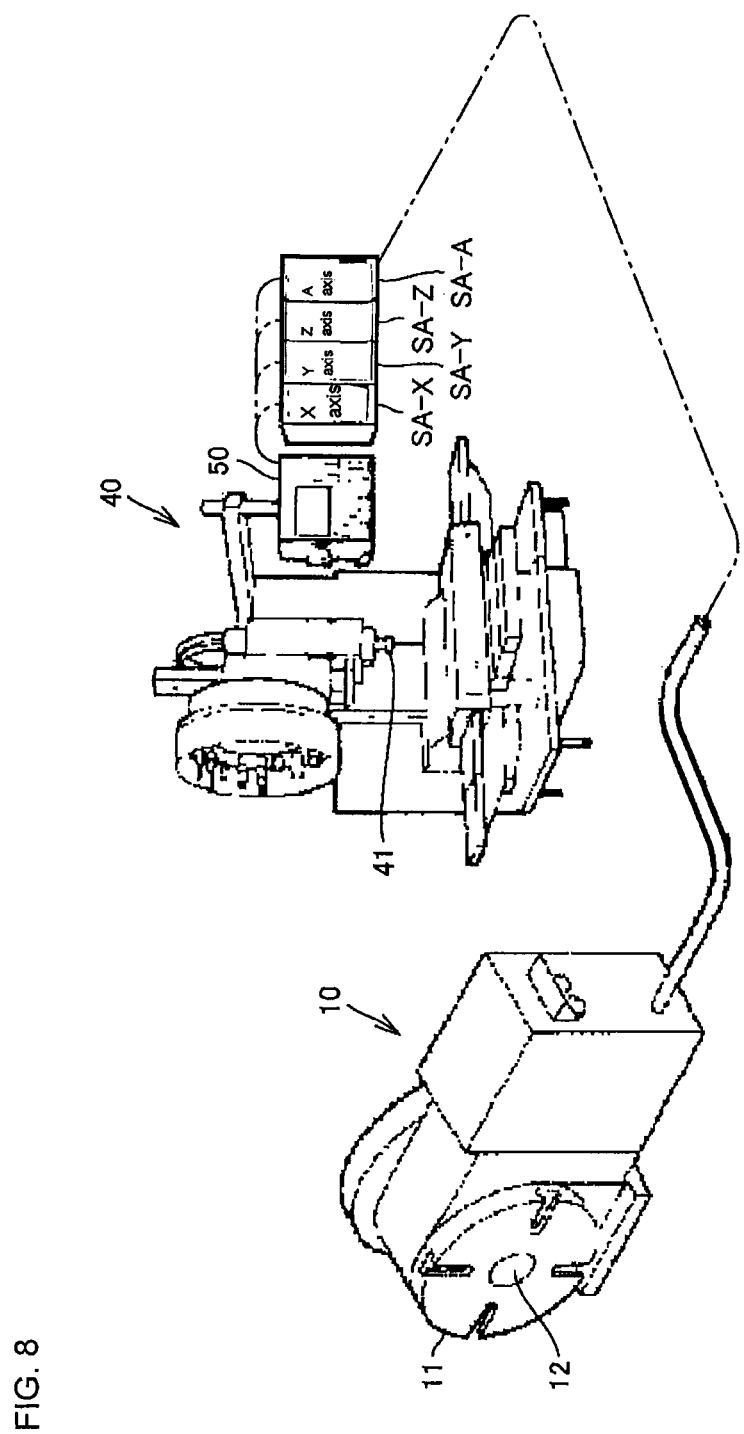
FIG. 8 is a perspective view showing a machining center having a plurality of feed shafts.

Next, an embodiment of a feed shaft abnormality determination system according to the present invention will be described. FIG. 8 is a perspective view showing a 4-axis control machining center which is a determination target of the feed shaft abnormality determination system. FIG. 8 is a schematic diagram showing portions where respective feed shafts of the 4-axis control machining center are numerically controlled.

As shown in FIG. 8, the 4-axis control machining center includes the indexing unit 10, a spindle device 40, a numerical control unit 50, and servo amplifiers SA-X, SA-Y, SA-Z, and SA-A for respective feed shafts.

The indexing unit 10 is configured as described above, and includes the table 11, the spindle 12 that is coaxially fixed to the table 11, and a servo motor 17A that drives the spindle 12. The spindle 12 corresponds to a feed shaft (A axis) involved with rotation. The indexing unit 10 is a machine tool in which the rotation angle of the A axis is numerically controlled.

The spindle device 40 includes a spindle 41, a servo motor 17X that drives the spindle 41 in the X-axis direction, a servo motor 17Y that drives the spindle 41 in the Y-axis direction, and a servo motor 17Z that drives the spindle 41 in the Z-axis direction. The X axis, the Y axis, and the Z axis are feed axes related to linear motion. The spindle device 40 is a machine tool in which the X axis, the Y axis, and the Z axis are numerically controlled.

Encoders EC-X, EC-Y, EC-Z, and EC-A are attached to these servo motors, respectively. The servo motors 17X, 17Y, 17Z, and 17A are connected to the corresponding servo amplifiers SA-X, SA-Y, SA-Z, and SA-A, respectively. The servo amplifiers SA-X, SA-Y, SA-Z, and SA-A are connected to the numerical control unit 50. The connection between them indicated by a two-dot chain line in FIG. 8 is achieved using a wired unit such as a cable. However, a wireless communication unit or a network connection unit may be used for signal communication by weak current, such as command including a drive torque command or monitoring as shown in FIG. 2.

The numerical control unit 50 receives data related to the rotation angle from the respective encoders EC-X, EC-Y, EC-Z, and EC-A, and outputs commands to the respective servo amplifiers SA-X, SA-Y, SA-Z, and SA-A to execute feedback control of the servo motors 17X, 17Y 17Z, and 17A.

The numerical control unit 50 includes a programmable machine controller PMC, a numerical controller NC, and a feed shaft abnormality determination unit (not shown). The programmable machine controller PMC serving as a command generation unit moves the feed shafts for the X axis, Y axis, and Z axis in the forward direction at a predetermined speed from the lower limit value to the upper limit value of the range of feeding movement by the numerical controller NC.

The feed shaft abnormality determination unit monitors the drive torque command during the movement of the respective feed shafts in the forward direction, compares the monitoring result during the movement in the forward direction with the normal value of the drive torque command, determines that abnormality occurs when the monitored drive torque command deviates from the normal value, and outputs the determination result. The process of the feed shaft abnormality determination unit is similar to that of the feed shaft (spindle 12) for the A axis described above, and therefore the description thereof will not be repeated.

Figure 9:
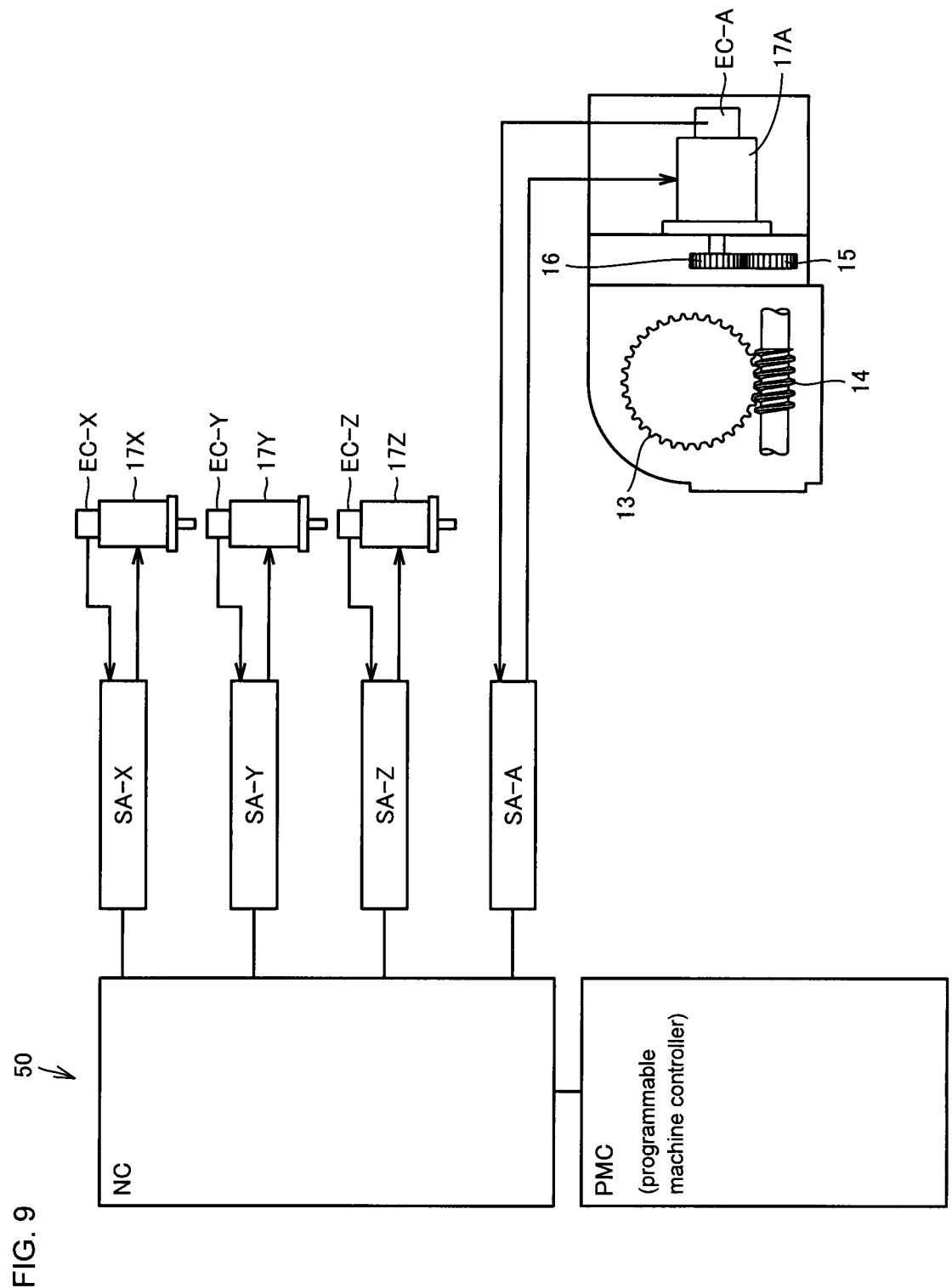
FIG. 9 is a schematic diagram showing a part related to numerical control of respective feed shafts.

According to the embodiment shown in FIGS. 8 and 9, it is possible to determine whether the index angle of the A axis is normal or abnormal, and whether the feeding positions for the X axis, Y axis, and Z axis are normal or abnormal.

While the embodiment of the present invention has been described above with reference to the drawings, the present invention is not limited to the abovementioned illustrated embodiment. The illustrated embodiment can be variously modified and changed within the scope same as or equivalent to the scope of the present invention.

The present invention is applied to a machine tool.

REFERENCE SIGNS LIST

10 indexing unit
11 table
12 spindle
13 worm gear
14 worm screw
15 main gear
16 motor gear
17 servo motor
18 numerical controller
19 worm gear abnormality determination unit
20 backlash amount calculation unit
21 worm gear abnormality display unit
EA, EB contact
EC encoder

What is claimed is:

1. A feed shaft abnormality determination system mounted on a machine tool that includes a feed shaft, a servo motor that drives said feed shaft, a numerical controller that controls a drive torque of said servo motor, and an encoder that detects a speed and a feeding position of said feed shaft, the system determining whether said feed shaft is normal or abnormal, the system comprising:
   a command generation unit that moves said feed shaft in a forward direction at a predetermined speed from a lower limit value to an upper limit value of a range of feeding movement by said numerical controller; and
   a feed shaft abnormality determination unit that monitors a drive torque command and/or a position feedback output to said servo motor from said numerical controller during the movement of said feed shaft in the forward direction by said command generation unit, compares a monitoring result during the movement in said forward direction with a normal value of the drive torque command, determines that abnormality occurs when said drive torque command deviates from said normal value, and outputs a result of the determination,
   wherein said feed shaft abnormality determination unit calculates a feeding position of said feed shaft on the basis of said predetermined speed of said servo motor and a time from when the movement of said feed shaft in said forward direction is started until said deviation during the movement in the forward direction or on the basis of said position feedback, and outputs the calculated feeding position as an abnormal feeding position.

2. The feed shaft abnormality determination system according to claim 1, wherein said normal value is a drive torque command after said machine tool is newly assembled and subjected to a break-in operation, a jig necessary for machining a workpiece is attached to said machine tool, and said machine tool is operated.

3. The feed shaft abnormality determination system according to claim 1, wherein said deviation indicates a state in which said monitoring result of said drive torque command is greater than a value obtained by multiplying said normal value by a predetermined factor greater than 1.

4. The feed shaft abnormality determination system according to claim 1, wherein
said command generation unit moves said feed shaft in a reverse direction by said numerical controller at a predetermined speed from said upper limit value to said lower limit value of said range of feeding movement, and
said feed shaft abnormality determination unit calculates a feeding position of said feed shaft on the basis of said predetermined speed of said servo motor during the movement in the reverse direction and a time from when said feed shaft starts the movement in the reverse direction until said deviation during the movement in the reverse direction or on the basis of said position feedback, and outputs the calculated feeding position as an abnormal feeding position.

5. A worm gear abnormality determination system mounted on an indexing unit that includes a spindle which performs indexing, a worm gear provided on said spindle, a worm screw that engages with said worm gear, a servo motor that drives said worm screw, a numerical controller that controls a drive torque of said servo motor, and an encoder that detects a speed or a position of said spindle, the system determining whether said spindle is normal or abnormal, the system comprising:
a command generation unit that rotates said spindle in a forward direction at a predetermined speed from an index angle of 0° to 360° by said numerical controller; and
a worm gear abnormality determination unit that monitors a drive torque command and/or a position feedback output to said servo motor from said numerical controller during the forward rotation of said spindle by said command generation unit, compares a monitoring result during said forward rotation and a normal value of the drive torque command, determines that abnormality occurs when said drive torque command deviates from said normal value, and outputs a result of the determination,
wherein said worm gear abnormality determination unit calculates an index angle of said spindle on the basis of said predetermined speed of said servo motor and a time from when said forward rotation of said spindle is started until said deviation or on the basis of said position feedback, and outputs the index angle associated with said drive torque command deviating from said normal value as an abnormal index angle.

6. The worm gear abnormality determination system according to claim 5, wherein said normal value is a drive torque command after said indexing unit is newly assembled and subjected to a break-in operation, a jig necessary for machining a workpiece is attached to said indexing unit, and a trial operation of said indexing unit is performed.

7. The worm gear abnormality determination system according to claim 5, wherein said deviation indicates a state in which said monitoring result of said drive torque command is greater than a value obtained by multiplying said normal value by a predetermined factor greater than 1.

8. The worm gear abnormality determination system according to claim 5, wherein
said command generation unit rotates said spindle in a reverse direction by said numerical controller at a predetermined speed from an index angle of 360° to 0°, and
said worm gear abnormality determination unit calculates an index angle of the spindle on the basis of said predetermined speed of said servo motor during the reverse rotation and a time from when said spindle starts the reverse rotation until said deviation or on the basis of said position feedback, and outputs the calculated index angle as an abnormal index angle.

9. The worm gear abnormality determination system according to claim 8, further comprising a backlash amount calculation unit that calculates a backlash amount at a position where said worm gear and said worm screw are engaged with each other at said abnormal index angle.

10. The worm gear abnormality determination system according to claim 9, wherein
a table is fixed to said spindle, and
said backlash amount calculation unit executes a backlash calculation program for firstly rotating said table in a forward direction up to said abnormal index angle by said numerical controller, and secondly rotating said table in a reverse direction by said numerical controller, and calculates a backlash amount during the reverse rotation on the basis of a change over time of said drive torque command during the reverse rotation or on the basis of a change in said drive torque command with respect to position during the reverse rotation.

11. The worm gear abnormality determination system according to claim 10, wherein, when it is determined that said abnormality occurs at a plurality of index angles, said backlash amount calculation unit calculates said backlash amount at all of said abnormal index angles.

12. The worm gear abnormality determination system according to claim 5, further comprising a worm gear abnormality display unit that displays information output from said worm gear abnormality determination unit.

* * * * *